(12) United States Patent
Kageyama et al.

(10) Patent No.: US 8,763,448 B2
(45) Date of Patent: Jul. 1, 2014

(54) DIAGNOSIS DEVICE AND DIAGNOSIS METHOD FOR FAN COUPLING DEVICE

(75) Inventors: Yuzo Kageyama, Isehara (JP);
Mitsuhiko Kubota, Sagamihara (JP);
Takashi Nakazawa, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 146 days.

(21) Appl. No.: 13/515,352

(22) PCT Filed: Nov. 4, 2010

(86) PCT No.: PCT/JP2010/069585
§ 371 (c)(1),
(2), (4) Date: Jun. 12, 2012

(87) PCT Pub. No.: WO2011/074343
PCT Pub. Date: Jun. 23, 2011

(65) Prior Publication Data
US 2012/0247196 A1    Oct. 4, 2012

(30) Foreign Application Priority Data

Dec. 17, 2009    (JP) ................................. 2009-286099

(51) Int. Cl.
*G01M 15/04* (2006.01)
(52) U.S. Cl.
USPC ..................................... 73/114.68; 73/114.77
(58) Field of Classification Search
USPC .......................................... 73/114.68, 114.77
See application file for complete search history.

(56) References Cited

U.S. PATENT DOCUMENTS

| | | | | |
|---|---|---|---|---|
| 5,931,273 | A | * | 8/1999 | Moser ......................... 192/58.42 |
| 6,732,845 | B2 | * | 5/2004 | Tilly et al. .................. 192/58.61 |
| 2002/0195068 | A1 | | 12/2002 | Ichinose et al. |
| 2004/0223851 | A1 | | 11/2004 | Shiozaki et al. |
| 2006/0254540 | A1 | * | 11/2006 | Tuttle ......................... 123/41.49 |

FOREIGN PATENT DOCUMENTS

| | | |
|---|---|---|
| CN | 1550688 A | 12/2004 |
| CN | 1607327 A | 4/2005 |
| CN | 201354673 Y | 12/2009 |
| JP | 2004-144142 A | 5/2004 |
| JP | 2007-321622 A | 12/2007 |
| JP | 2009-057864 A | 3/2009 |

OTHER PUBLICATIONS

Chinese Office Action dated Nov. 26, 2013 (5 pgs.), 201080057148.9.

* cited by examiner

*Primary Examiner* — Eric S McCall
(74) *Attorney, Agent, or Firm* — Foley & Lardner LLP

(57) ABSTRACT

A fan coupling device 1 connecting an internal combustion engine 31 to a cooling fan 21 comprises an input shaft 3 driven to rotate by the engine 31, a fluid coupling 12 that transmits torque from the input shaft 3 to the cooling fan 21 via a fluid, and a solenoid valve 13 having a valve main body 18 that adjusts a fluid amount in the fluid coupling 12. A determination as to whether or not the valve main body 18 is stuck in a lifted position on the basis of a rotation speed of the cooling fan 21, is started after the elapse of a predetermined time following output of a signal for returning the valve main body 18 to a closed position, The sticking determination can be performed with a high degree of precision without being affected by variation in the rotation speed of the input shaft 3.

11 Claims, 9 Drawing Sheets

DIAGNOSIS DEVICE AND DIAGNOSIS METHOD FOR FAN COUPLING DEVICE

FIELD OF THE INVENTION

This invention relates to diagnosis of a fan coupling device used in a cooling system of an internal combustion engine.

BACKGROUND OF THE INVENTION

A cooling fan of an internal combustion engine blows cooling air onto a radiator that discharges heat from a cooling fluid of the internal combustion engine in order to cool the radiator. A fan coupling device that connects the cooling fan to an input shaft driven by the internal combustion engine transmits torque using a viscosity of a working fluid.

JP2007-321622A, published by the Japan Patent Office in 2007, proposes a malfunction diagnosis device for a fan coupling device that diagnoses a malfunction in the fan coupling device when a rotation speed of a cooling fan remains in a low state even though the fan coupling device is fully locked.

SUMMARY OF THE INVENTION

A fan coupling device transmits torque between an input shaft and a cooling fan via a fluid coupling. The torque transmitted at this time can be controlled by adjusting an amount of working fluid in the fluid coupling. More specifically, for example, working fluid is supplied to the fluid coupling via a solenoid valve while working fluid in the fluid coupling is recirculated to a tank by a centrifugal force of the fluid coupling.

By varying an opening of the solenoid valve, the amount of working fluid in the fluid coupling is increased and reduced, leading to an increase or a reduction in the amount of transmitted torque, which is dependent on the viscosity of the working fluid.

In this type of fluid coupling, control of the transmitted torque malfunctions when the solenoid valve sticks.

When the solenoid valve sticks in an open state, the rotation speed of the fan does not decrease even in response to a command to reduce the opening of the solenoid valve. Hence, sticking of the solenoid valve may be detected by comparing an opening signal issued to the solenoid valve with the rotation speed of the fan.

However, the working oil in the fluid coupling is recirculated to the tank by centrifugal force, and therefore the interior of the fluid coupling does not become empty immediately after the solenoid valve is closed. The centrifugal force of the fluid coupling varies according to a rotation speed of the input shaft, and at a low speed, the centrifugal force is small, meaning that a flow rate of the working fluid recirculated to the tank from the fluid coupling is also small. As a result, when the solenoid valve is closed at a low speed, the transmitted torque does not decrease immediately, and instead decreases at a predetermined delay.

In other words, variation in a correlative relationship between the opening of the solenoid valve and the transmitted torque is dependent on the rotation speed of the input shaft.

It is therefore an object of this invention to diagnose sticking of a solenoid valve accurately without being affected by variation in a rotation speed of an input shaft.

In order to achieve the above object, this invention provides a diagnosis device for use with a fan coupling device which connects an internal combustion engine to a cooling fan that blows cooling air onto a radiator for cooling a coolant of the internal combustion engine. The fan coupling device comprises an input shaft that is driven to rotate by the internal combustion engine, a fluid coupling that transmits torque from the input shaft to the cooling fan via a fluid, and a solenoid valve that adjusts a fluid amount in the fluid coupling via a valve main body that is displaced in response to energization between a lifted position in which the fluid amount increases and a closed position in which the fluid amount decreases. The diagnosis device is used to determine whether or not the valve main body is stuck in the lifted position. The diagnosis device comprises a sensor that detects a rotation speed of the cooling fan, and a controller.

The controller is programmed to output a signal in order to return the valve main body to the closed position, and start to determine whether or not the valve main body is stuck in the lifted position on the basis of the rotation speed of the cooling fan following the elapse of a predetermined time from output of the signal.

This invention also provides a diagnosis method for use with the fan coupling device described above to determine whether or not the valve main body is stuck in the lifted position. The diagnosis method comprises detecting a rotation speed of the cooling fan, outputting a signal in order to return the valve main body to the closed position, and starting to determine whether or not the valve main body is stuck in the lifted position on the basis of the rotation speed of the cooling fan following the elapse of a predetermined time from output of the signal.

The details as well as other features and advantages of this invention are set forth in the remainder of the specification and are shown in the accompanying drawings.

DESCRIPTION OF THE PREFERRED EMBODIMENTS

Figure 1:
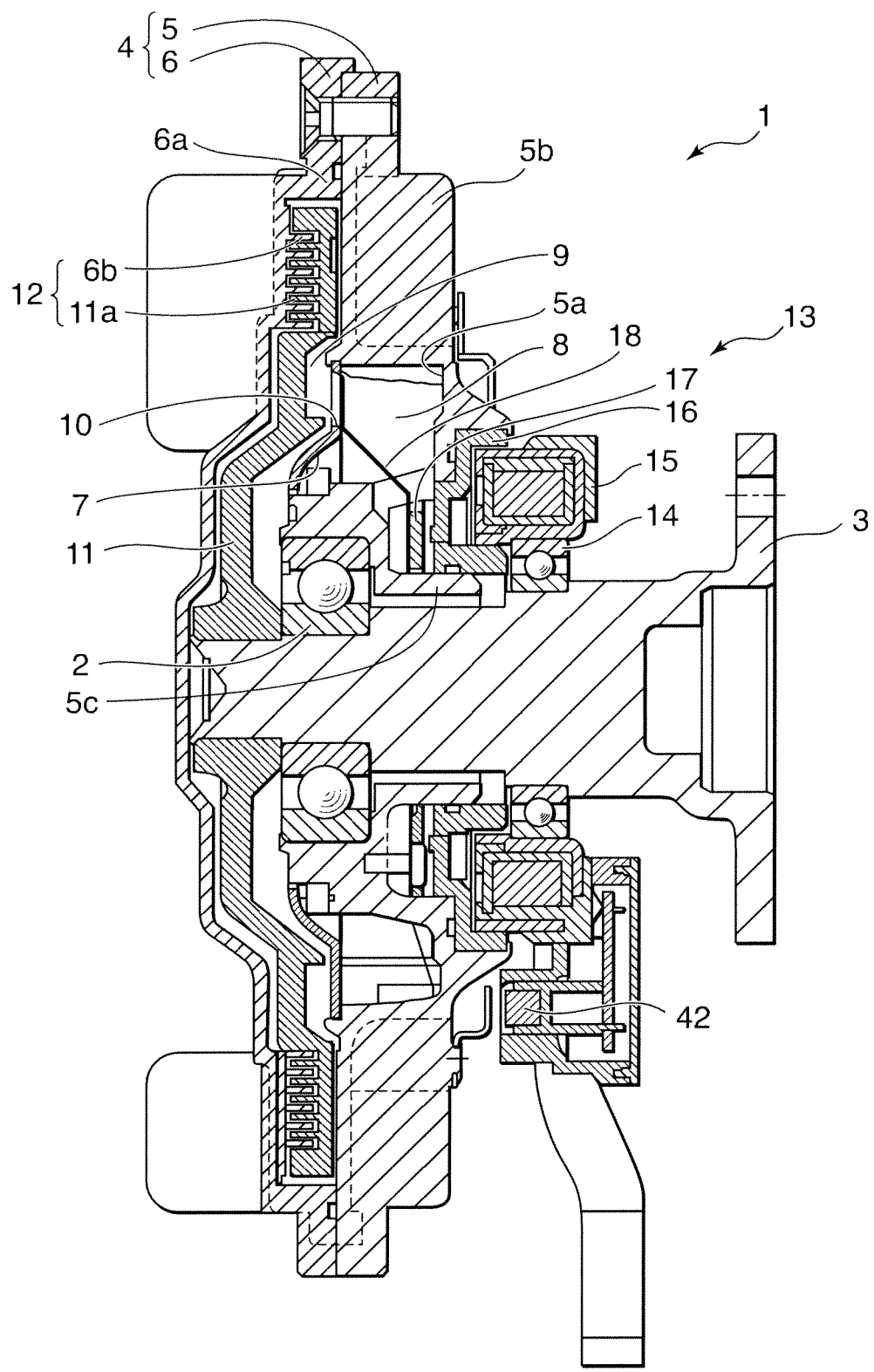
FIG. 1 is a schematic constitutional diagram of a fan coupling device according to a first embodiment of this invention.

Referring to FIG. 1 of the drawings, a fan coupling device 1 used in a cooling device of an internal combustion engine for a vehicle includes a housing 4 supported to be free to rotate relative to an input shaft 3 via a bearing 2. A left side of the figure corresponds to a vehicle front, and a right side corresponds to a vehicle rear.

The housing 4 is constituted by a housing main body 5 supported on the input shaft 3 to be free to rotate via the bearing 2, and a cover 6 fixed to a front surface of the housing main body 5 by a bolt.

Figure 2:
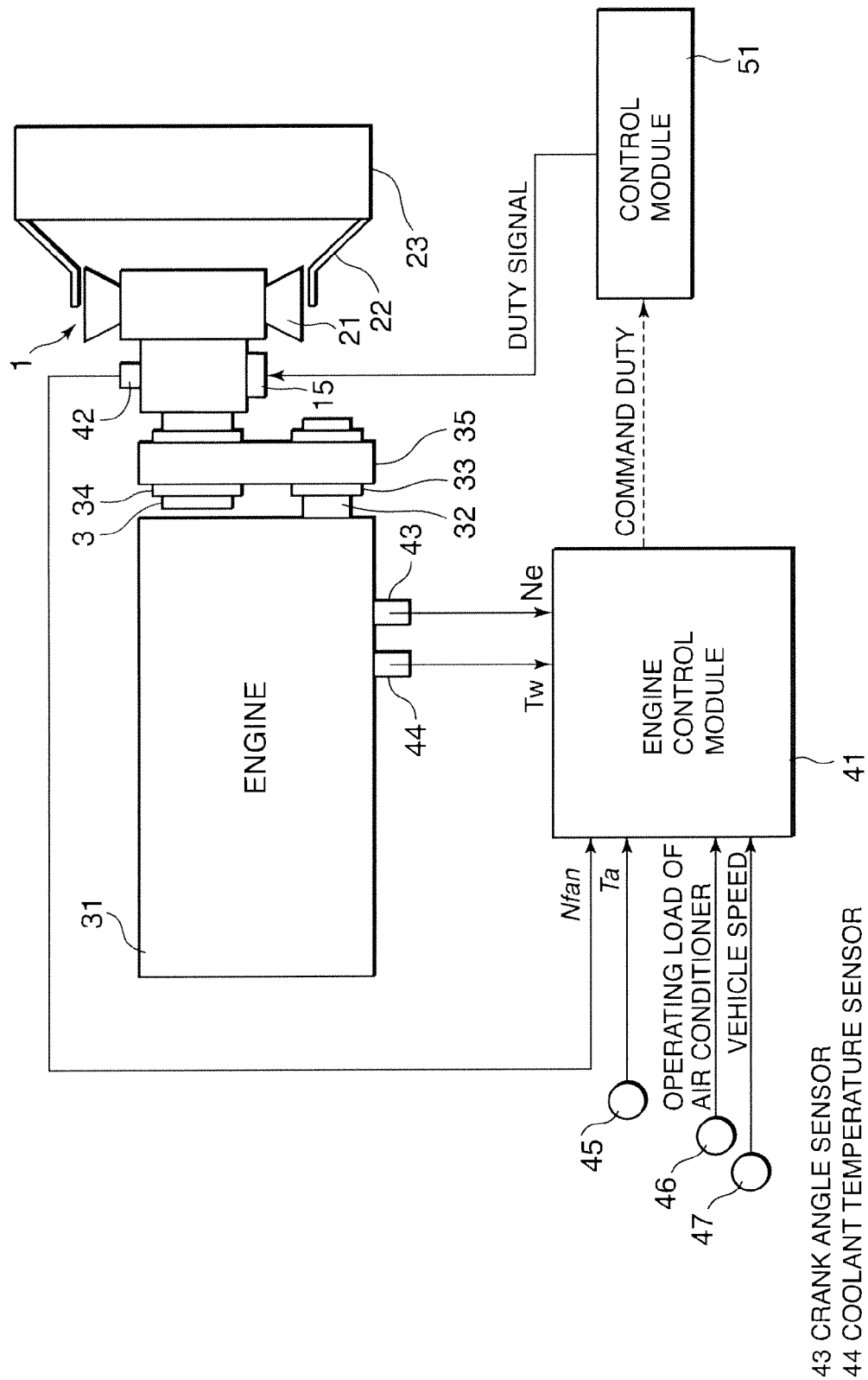
FIG. 2 is a schematic constitutional diagram of a cooling system for an internal combustion engine provided with the fan coupling device.

Referring to FIG. 2, a cooling fan 21 shown in FIG. 2 is fixed to an outer peripheral side of the housing 4 by a bolt.

Referring back to FIG. 1, an inner side of the housing 4 is partitioned into a storage chamber 8 and an operation chamber 9 by a ring-shaped partition plate 7. A connecting hole 10 connecting the storage chamber 8 and the operation chamber 9 is formed in the partition plate 7. A disk 11 is fixed to a tip end of the input shaft 3 on an inner side of the cover 6 positioned in front of the partition plate 7, or in other words on the left side of the figure.

A labyrinth groove 11*a* is formed in an outer periphery of the disk 11. A labyrinth groove 6*b* that cooperates with the labyrinth groove 11*a* is formed in the cover 6 so as to oppose the labyrinth groove 11*a*. The labyrinth groove 11*a* and the labyrinth groove 6*b* are respectively constituted by a plurality of circular grooves that form concentric circles defined by a plurality of circular land portions. The labyrinth groove 11*a* and the labyrinth groove 6*b* are disposed such that a first land portion invades a second circular groove in a non-contact state, and a second land portion invades a first circular groove. The labyrinth groove 6*b* and the labyrinth groove 11*a* together constitute a fluid coupling 12 that transmits a rotation of the disk 11 to the housing 4.

When the disk 11 rotates in a state where gaps between the land portions and the circular grooves are filled with a working fluid, rotary torque is transmitted from the disk 11 to the cover 6 via the working fluid in the respective gaps. This state will be referred to as an engaged state of the fluid coupling 12. When the disk 11 rotates in a state where no working fluid exists in the gaps between the land portions and the circular grooves, on the other hand, the labyrinth groove 11*a* and the labyrinth groove 6*b* rotate relative to each other arbitrarily, and no rotary torque is transmitted from the disk 11 to the cover 6. This state will be referred to as a disengaged state of the fluid coupling 12. When the fluid coupling 12 is between the engaged state and the disengaged state, rotary torque is transmitted in accordance with an amount of working oil existing in the gaps between the land portions and the circular grooves.

To form the storage chamber 8 around the input shaft 3, a boss portion 5*c* that surrounds the input shaft 5 and a ring-shaped recessed portion 5*a* positioned on an outer side of the boss portion 5*c* are formed in the housing main body 5. A working fluid return passage that recirculates the working fluid in the operation chamber 9 to the storage chamber 8 using centrifugal force is formed in an outer peripheral portion 5*b* of the housing main body 5, which opposes an outer periphery of the recessed portion 5*a*.

A solenoid valve 13 that opens and closes the connecting hole 10 in the partition plate 7 is provided in the housing 4.

The solenoid valve 13 includes an exciting coil 15, an iron core 16, an armature 17, and a valve main body 18. The exciting coil 15, the iron core 16, and the armature 17 are respectively formed in a ring shape.

The exciting coil 15 is fixed to a vehicle body so as to rotate relative to the input shaft 3 via a bearing 14. The iron core 16 is fixed to the housing main body 5 in front of the exciting coil 15. The armature 17 is fitted to the boss portion 5*c* of the housing main body 5 to be free to slide in an axial direction, and faces the iron core 16 in the storage chamber 8 in front of the iron core 16. The valve main body 18 is fixed to the armature 17 at a base end thereof in order to open and close the connecting hole 10 in accordance with an axial direction displacement of the armature 17. The armature 17 is biased in a direction for closing the connecting hole 10 by a spring.

When the exciting coil 15 is not energized, therefore, the valve main body 18 fixed at its base end to the armature 17 closes the connecting hole 10. When the exciting coil 15 is energized, the iron core 16 is magnetized such that the armature 17 is attracted toward the iron core 16. As a result, the armature 17 retreats against a biasing force of the spring such that the valve main body 18 opens the connecting hole 10.

Referring back to FIG. 2, a crank pulley 33 is fixed to a crankshaft 32 of an internal combustion engine 31 of the vehicle. A pulley 34 is fixed to the input shaft 3 of the fan coupling device 1. The crank pulley 33 and the pulley 34 are joined by a belt 35 such that the input shaft 3 is driven to rotate by the crankshaft 32.

In the figure, a right side corresponds to the vehicle front and a left side corresponds to the vehicle rear. The fan coupling device 1 is disposed in a front position of an engine room of the vehicle, or in other words on the right side of the internal combustion engine 31 in the figure. A cooling radiator 23 that cools the internal combustion engine 31 is disposed in front of the fan coupling device 1. The radiator 23 is coupled to the fan coupling device 1 via a shroud 22.

An operation of the fan coupling device 1, which is performed via the solenoid valve 13 while the internal combustion engine 31 is operative, will be described below.

When the exciting coil 15 is energized while the input shaft 3 is rotating, the valve main body 18 opens the connecting hole 10 provided in the partition plate 7. When the connecting hole 10 opens, the working fluid in the storage chamber 8 flows into the operation chamber 9 through the connecting hole 10 and is thus supplied to the fluid coupling 12. In the fluid coupling 12, the gaps between the labyrinth grooves 11*a* and 6*b* are filled with the working fluid, whereby rotary torque is transmitted from the disk 11 to the housing 4 in accordance with the viscosity of the working fluid.

The torque transmitted from the disk 11 to the housing 4 increases steadily as the amount of working fluid supplied to the fluid coupling 12 increases, and accordingly, a speed at which the housing 4 and the cooling fan 21 fixed to the outer periphery of the housing 4 rotate increases. As a result, a speed of cooling air drawn into the radiator 23 increases regardless of a vehicle speed, leading to an increase in an amount of heat discharged from the radiator 23. When the amount of heat discharged from the radiator 23 increases, a coolant temperature in the radiator 23 decreases.

When energization of the exciting coil 15 is stopped, the valve main body 18 closes the connecting hole 10 provided in the partition plate 7 such that the working fluid is prevented from flowing into the operation chamber 9 from the storage chamber 8. The working fluid in the operation chamber 9 and the fluid coupling 12 is recirculated to the storage chamber 8 from the operation chamber 9 through the working fluid return passage by centrifugal force, and therefore the amount of working fluid filling the gaps of the fluid coupling 12 decreases. As a result, the torque transmitted from the disk 11 to the housing 4 via the working fluid also decreases, leading to a reduction in the rotation speed of the cooling fan 21.

Opening/closing control of the solenoid valve 13 is performed by a control module 51. The opening/closing control is performed by duty control based on a duty signal. Further, operations of the internal combustion engine 31 are controlled by an engine control module 41.

Detection signals from a fan rotation speed sensor 42 that detects a rotation speed Nfan of the cooling fan 21, a crank angle sensor 43 that detects a rotation speed Ne of the internal combustion engine 31, a coolant temperature sensor 44 that detects a coolant temperature Tw of the internal combustion engine 31, an outside air temperature sensor 45 that detects an outside air temperature Ta, a load sensor 46 that detects an operating load of an air conditioner provided in the vehicle, and a vehicle speed sensor 47 that detects a traveling speed of the vehicle are input individually into the engine control module 41.

The engine control module 41 calculates a command duty for the solenoid valve 13 in accordance with operating conditions of the vehicle or the internal combustion engine 31, which are determined from the input signals from the respective sensors. The calculated command duty is transmitted to the control module 51 from the engine control module 41.

The engine control module 41 and the control module 51 are respectively constituted by microcomputers including a central processing unit (CPU), a read only memory (ROM), a random access memory (RAM), and an input/output interface (I/O interface). The engine control module 41 and the control module 51 may be constituted by a single microcomputer.

The two control modules 41 and 51 are joined by control area network (CAN) communication. The engine control module 41 outputs the command duty to the control module 51 via CAN communication, and the control module 51 converts the command duty into a duty signal and outputs the duty signal to the exciting coil 15 of the solenoid valve 13. By having the two control modules 41, 51 perform CAN communication rather than connecting the two control modules 41, 51 by two communication lines, a large amount of information can be communicated using a small number of wires.

In this embodiment, an excitation current of the exciting coil 15 is set to increase as the command duty increases. As the excitation current of the exciting coil 15 increases, a gap formed between the connecting hole 10 and the valve main body 18 increases, leading to an increase in the amount of working fluid flowing into the operation chamber 9 from the storage chamber 8. When the command duty is 0%, the connecting hole 10 is closed by the valve main body 18 such that the amount of working fluid flowing into the operation chamber 9 from the storage chamber 8 is zero. When the command duty is 100%, the amount of working fluid flowing into the operation chamber 9 from the storage chamber 8 reaches a maximum, and as a result, the fan rotation speed Nfan becomes equal to a rotation speed Nin of the input shaft 3.

Next, an outline of control of the fan rotation speed, executed by the engine control module 41, will be described. The engine control module 41 sets a target fan rotation speed tNfan in accordance with the operating conditions of the internal combustion engine 31. The engine control module 41 then feedback-controls the command duty so that the actual fan rotation speed Nfan detected by the fan rotation speed sensor 42 matches the target fan rotation speed tNfan.

The target fan rotation speed tNfan is set as follows.

The operating conditions are defined by three parameters, for example the coolant temperature Tw, the air conditioner operating load, and the vehicle speed. When the air conditioner operating load and the vehicle speed are constant, the engine control module 41 sets the target fan rotation speed tNfan to be higher as the coolant temperature Tw increases. The reason for this is that when the coolant temperature Tw is high, the amount of heat discharged from the radiator 23 must be increased, and therefore the target fan rotation speed tNfan must be set high in order to increase the amount of heat discharged from the radiator 23.

When the coolant temperature Tw and the vehicle speed are constant, the engine control module 41 sets the target fan rotation speed tNfan to be higher as the air conditioner operating load increases.

Further, when the coolant temperature Tw and the air conditioner operating load are constant, the engine control module 41 sets the target fan rotation speed tNfan to be lower as the vehicle speed increases. As the vehicle speed increases, an amount of traveling air impinging on the radiator 23 increases, leading to an increase in the amount of heat discharged from the radiator 23. Therefore, to obtain a constant amount of heat discharge, the target fan rotation speed tNfan should be reduced by an amount corresponding to the increase in the amount of heat discharged from the radiator 23.

Incidentally, according to research conducted by the inventors, it was found that valve sticking, in which the valve main body 18 cannot close the connecting hole 10, may occur even when the command duty is switched to 0% in order to halt energization of the exciting coil 15. In the following description, a state in which the valve main body 18 sticks while open will be referred to as ON sticking.

Possible causes of ON sticking include foreign matter in the connecting hole 10 and a malfunction in an electric circuit of the solenoid valve 13, including the exciting coil 15. When foreign matter intermixed with the working fluid becomes intermeshed in the connecting hole 10 for some reason, it becomes physically impossible for the valve main body 18 to close the connecting hole 10, and therefore the working fluid supply from the storage chamber 8 to the operation chamber 9 and the fluid coupling 12 cannot be shut off. When the electric circuit of the solenoid valve 13 malfunctions such that energization of the exciting coil 15 cannot be stopped, the valve main body 18 cannot close the connecting hole 10, and therefore the working fluid supply from the storage chamber 8 to the operation chamber 9 and the fluid coupling 12 cannot be shut off.

Hence, when ON sticking occurs in the valve main body 18, the cooling fan 21 continues to rotate at the same rotation speed as the input shaft 3.

The input shaft 3 of the fan coupling device 1 is driven by the internal combustion engine 31. When ON sticking occurs in the valve main body 18, the internal combustion engine 31 continues to drive the cooling fan 21 to rotate unnecessarily, leading to an increase in a load of the internal combustion engine 31. An increase in the engine load may lead to an increase in exhaust gas volume and a resulting increase in exhaust emissions.

When the interior of the engine room is cooled excessively, activation of an exhaust catalyst is delayed. A delay in activation of the exhaust catalyst also causes an increase in exhaust emissions. It is therefore necessary to diagnose accurately whether or not ON sticking has occurred in the valve main body 18, and implement countermeasures.

To determine whether or not ON sticking has occurred in the valve main body 18, it may be determined whether or not the actual fan rotation speed Nfan detected by the fan rotation speed sensor 42 indicates a reduction in a state where the command duty has been switched to 0%, or in other words a state where an instruction has been issued to halt energization of the exciting coil 15. When ON sticking has not occurred in the valve main body 18, the actual fan rotation speed Nfan should decrease toward zero in the state where an instruction has been issued to halt energization of the exciting coil 15. When ON sticking has occurred in the valve main body 18, the actual fan rotation speed Nfan should maintain a substantially equal rotation speed to the input shaft 3 in the state where an instruction has been issued to halt energization of the exciting coil 15.

Figure 3:
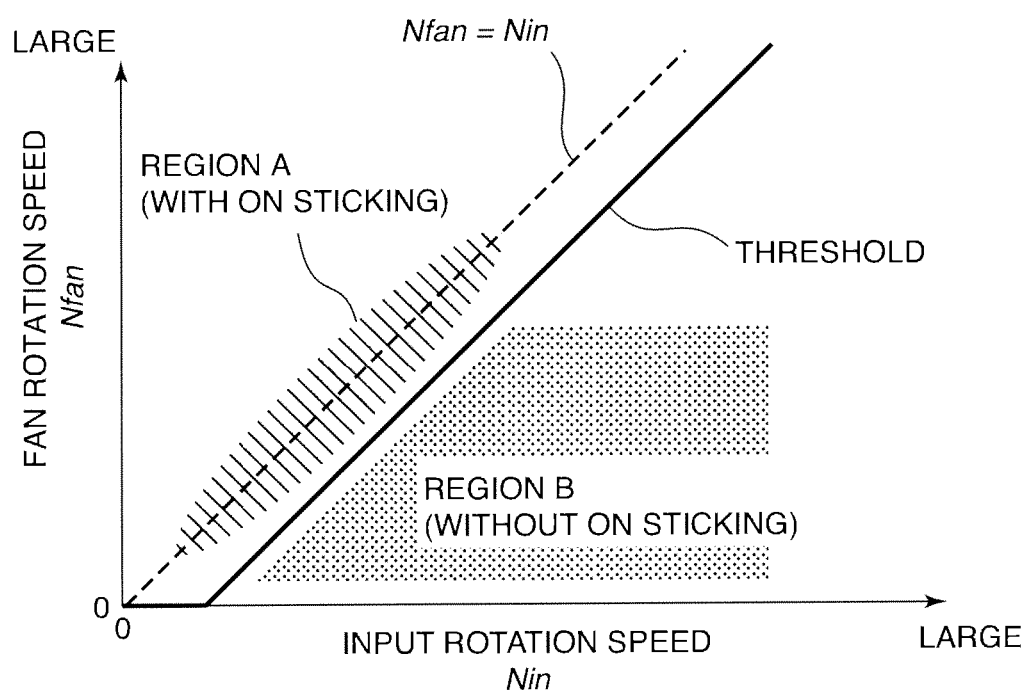
FIG. 3 is a diagram showing a relationship between an input rotation speed and a fan rotation speed when ON sticking has occurred and when ON sticking has not occurred.

Referring to FIG. 3, when ON sticking occurs in the valve main body 18, the actual fan rotation speed Nfan is higher than when ON sticking has not occurred in the valve main body 18. An abscissa in the figure shows the rotation speed Nin of the input shaft 3. It should be noted that in the following description, the rotation speed Nin of the input shaft 3 will be referred to as the input rotation speed Nin of the fan coupling device 1.

When ON sticking occurs in the valve main body 18, the actual fan rotation speed Nfan matches the input rotation speed Nin. Accordingly, fan rotation speeds Nfan in cases where ON sticking occurs are gathered in a region A of the figure. When ON sticking has not occurred in the valve main body 18, the actual fan rotation speed Nfan decreases in a direction heading away from the input rotation speed Nin, and therefore fan rotation speeds Nfan in cases where ON sticking has not occurred are gathered in a region B.

Hence, a rotation speed corresponding to a thick solid line in the figure, which is lower than the input rotation speed Nin in the figure by a predetermined amount, is set as a threshold, and when the actual fan rotation speed Nfan is equal to or higher than the threshold in the state where an instruction has been issued to halt energization of the exciting coil 15, it may be determined that ON sticking has occurred in the valve main body 18. When the actual fan rotation speed Nfan is lower than the threshold in the state where an instruction has been issued to halt energization of the exciting coil 15, it may be determined that ON sticking has not occurred in the valve main body 18.

It should be noted, however, that even when ON sticking has not occurred in the valve main body 18, the actual fan rotation speed Nfan does not start decreasing from the input rotation speed Nin as soon as the instruction to halt energization of the exciting coil 15 is issued, and instead, the fan rotation speed Nfan starts decreasing after maintaining a rotation speed close to the input rotation speed Nin for a short while.

Figure 4:
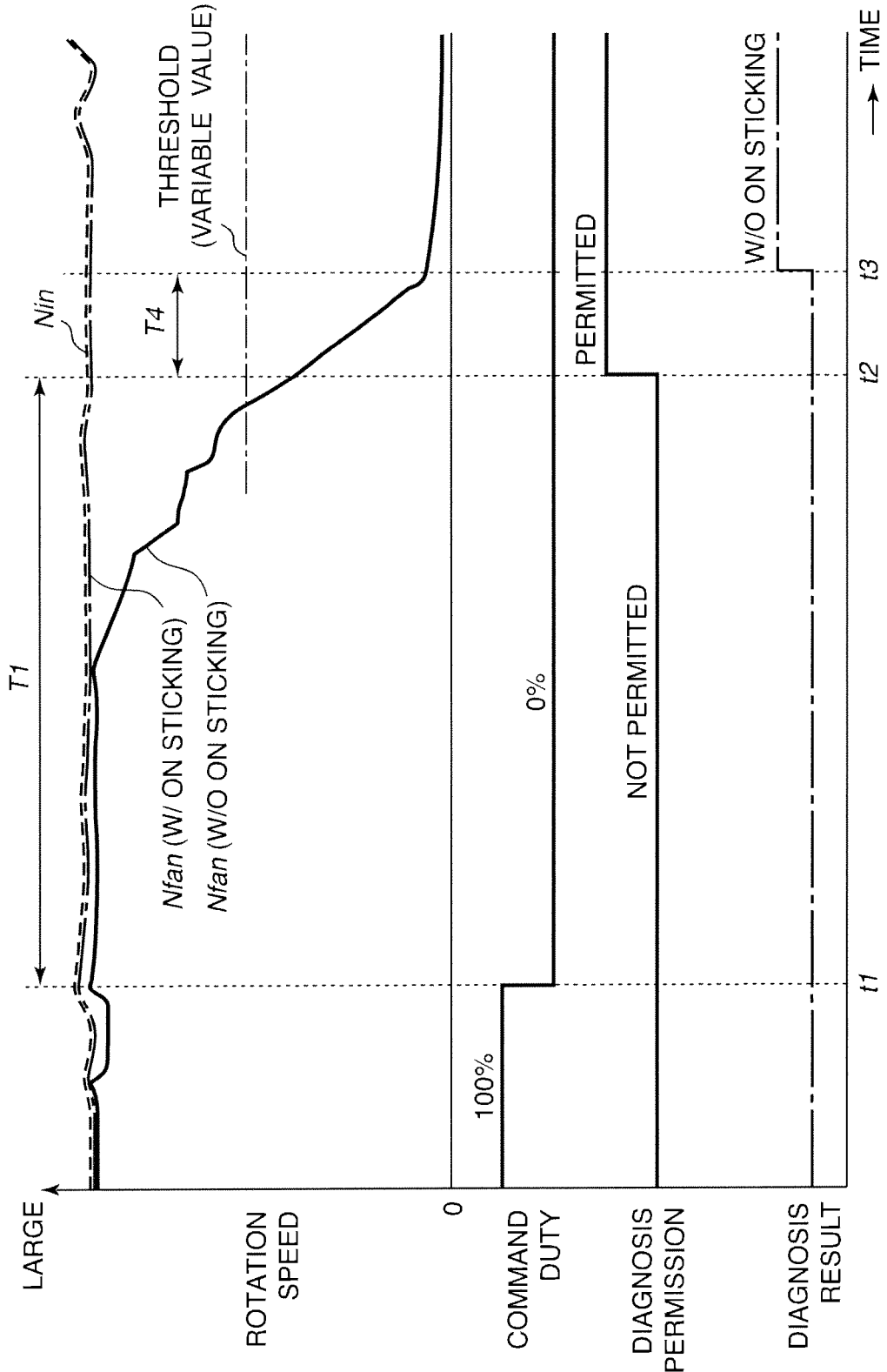
FIG. 4 is a timing chart illustrating a malfunction diagnosis algorithm executed by an engine control module according to the first embodiment of this invention.

Referring to FIG. 4, variation in the actual fan rotation speed Nfan and an ON sticking diagnosis performed by the engine control module 41 in a case where the command duty for the solenoid valve 13 is switched from 100% to 0%, or in other words an instruction to halt energization of the exciting coil 15 is issued from a state in which the exciting coil 15 is energized, while the input rotation speed Nin, or in other words the engine rotation speed Ne, is relatively low, will be described.

When ON sticking has occurred in the valve main body 18, the actual fan rotation speed Nfan, indicated by a dot-dash line, matches the input rotation speed Nin, indicated by a dotted line, even after the command duty is switched to 0% at a time t1.

When ON sticking has not occurred in the valve main body 18, the actual fan rotation speed Nfan maintains a value close to the input rotation speed Nin for a short while after the command duty is switched to 0% at the time t1, and then decreases away from the input rotation speed Nin toward zero.

The reason why the reduction in the actual fan rotation speed Nfan is delayed after the command duty is switched to 0% at the time t1 when ON sticking has not occurred in the valve main body 18 is as follows. In the fan coupling device 1, torque transmission is performed using the viscous working fluid, and therefore, if the centrifugal force is weak, the viscous working fluid does not return to the storage chamber 8 from the operation chamber 9 and the fluid coupling 12 immediately after the valve main body 18 closes the connecting hole 10 such that the supply of working fluid to the operation chamber 9 is stopped. Hence, ON sticking of the valve main body 18 cannot be determined accurately by comparing the actual fan rotation speed Nfan with the threshold immediately after the command duty is switched to 0%.

The engine control module 41 sets a timing following the elapse of a predetermined period after the command duty is switched to 0% as a timing for diagnosing ON sticking of the valve main body 18. A time required for all of the working fluid in the operation chamber 9 to return to the storage chamber 8 after the command duty is switched to 0% is set as the predetermined period. More specifically, as shown in FIG. 4, diagnosis is permitted at a timing of a time t2, at which the actual fan rotation speed Nfan in a case where ON sticking has not occurred in the valve main body 18 is sufficiently lower than the threshold. A predetermined period T1 is therefore a period extending from the time t1 to the time t2. The engine control module 41 establishes diagnosis permission conditions at the time t2 following the elapse of the predetermined value T1 from the time t1, and determines whether or not ON sticking has occurred in the valve main body 18 from the time t2 onward.

The time required for all of the working fluid in the operation chamber 9 to be recirculated to the storage chamber 8 after the command duty is switched to 0% increases as the input rotation speed Nin decreases. The fan coupling device 1 returns the working fluid to the storage chamber 8 from the operation chamber 9 and the fluid coupling 12 using the centrifugal force that acts on the working fluid remaining in the operation chamber 9 and the fluid coupling 12 as the housing 4 rotates. This centrifugal force decreases as the input rotation speed Nin decreases. Accordingly, the time required to recirculate all of the working fluid in the operation chamber 9 to the storage chamber 8 lengthens as the input rotation speed Nin decreases.

The predetermined period T1 is preferably set to increase as the input rotation speed Nin decreases. By setting the predetermined period T1 in this manner, ON sticking of the valve main body 18 can be diagnosed after all of the working fluid in the operation chamber 9 has been recirculated to the storage chamber 8, regardless of the input rotation speed Nin, and therefore a delay in the diagnosis can be kept to a minimum.

Figure 5:
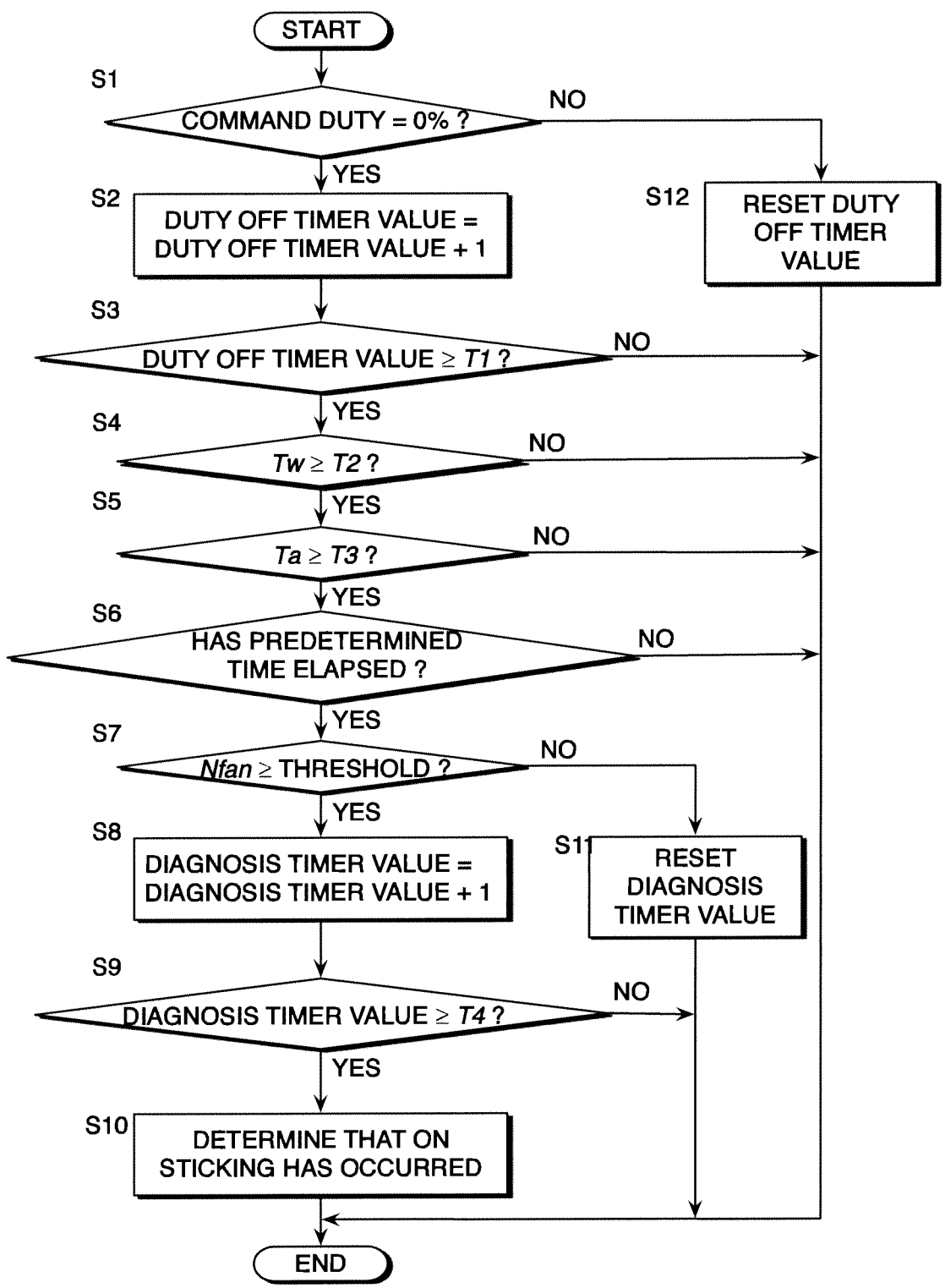
FIG. 5 is a flowchart illustrating a sticking diagnosis routine executed in relation to a solenoid valve by the engine control module according to the first embodiment of this invention.

Referring to FIG. 5, a routine for diagnosing sticking of the solenoid valve, which is executed by the engine control module 41 in order to realize the above control, will be described. The engine control module 41 executes this routine repeatedly at fixed time intervals of ten milliseconds, for example, while the internal combustion engine 31 is operative.

In a step S1, the engine control module 41 determines whether or not the command duty is at 0%.

When the determination of the step S1 is negative, the engine control module 41 resets a duty OFF timer in a step S12 and then terminates the routine. When the determination of the step S1 is affirmative, the engine control module 41 increments the duty OFF timer by adding 1 to a value of the duty OFF timer in a step S2. Hence, the duty OFF timer value corresponds to a continuous amount of time after the command duty is switched to 0%, and as long as the command duty is maintained at 0%, the duty OFF timer value is incremented by 1 at each routine execution interval.

When the command duty has a value other than 0% in the step S1, the routine is terminated without permitting a sticking diagnosis on the valve main body 18. When the command duty has a value other than 0%, this means that the connecting hole 10 is not completely closed, and therefore the working fluid supply from the storage chamber 8 to the operation chamber 9 is not shut off so that the actual fan rotation speed Nfan does not decrease. The reason why a sticking diagnosis of the valve main body 18 is not permitted in this case is that if the sticking diagnosis is performed on the valve main body 18 in this case, ON sticking may be misdiagnosed even though the valve main body 18 is functioning normally.

It should be noted that the determination as to whether or not the command duty is at 0% made in the step S1 is based on an assumption that energization of the exciting coil 15 is stopped at a command duty of 0%. However, energization of the exciting coil 15 may be stopped at a command duty value close to 0% rather than a command duty of 0%. In this case, the command duty is compared with the command duty value at which energization of the exciting coil 15 is stopped in the step S1.

In a step S3, the engine control module 41 determines whether or not the duty OFF timer value is equal to or greater than the predetermined value T1. The predetermined value T1 corresponds to the predetermined time required for all of the working fluid in the operation chamber 9 to be discharged after the command duty is switched to 0%.

Figure 6:
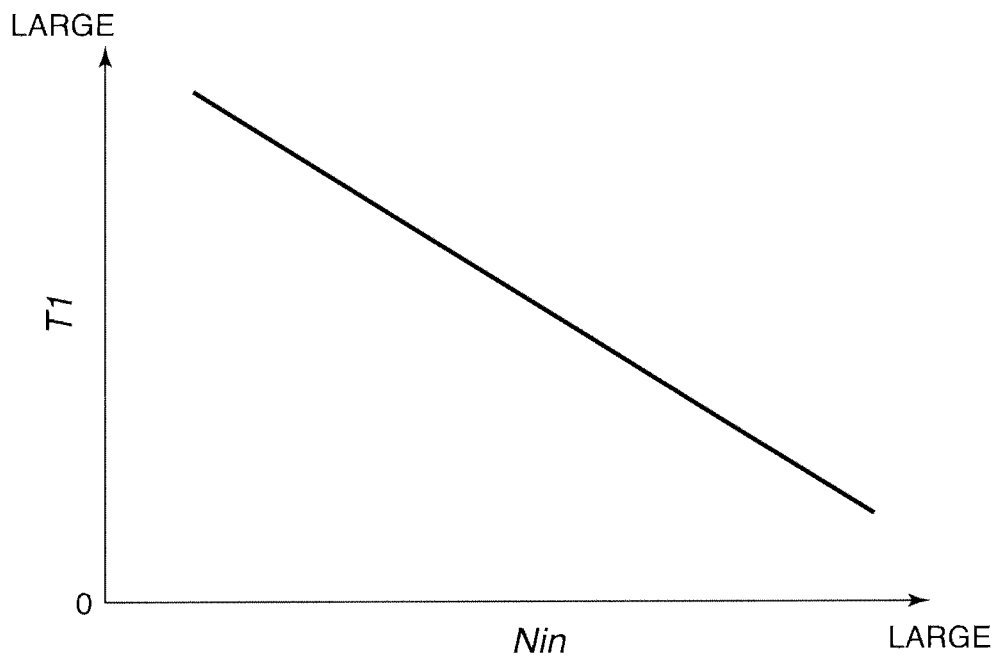
FIG. 6 is a diagram showing characteristics of a map of a predetermined value T1, which is stored by the engine control module.

Referring to FIG. 6, the engine control module 41 preferably stores a map of the predetermined value T1, having the characteristics shown in FIG. 6, in advance in the ROM, and determines the predetermined value T1 from the input rotation speed Nin by referring to the map before executing the routine. The map of the predetermined value T1 is set in advance through experiments and simulations. As shown in FIG. 6, the predetermined value T1 is dependent on the input rotation speed Nin, and increases as the input rotation speed Nin decreases.

The input rotation speed Nin is calculated using the engine rotation speed Ne in accordance with a following Equation (1).

$$Nin = Ne \times \text{pulley ratio} \quad (1)$$

The pulley ratio is a diameter ratio between the crank pulley 33 and the pulley 34. Instead of using the engine rotation speed Ne detected by the crank angle sensor 43, an input rotation speed sensor that detects the rotation speed of the input shaft 3 directly may be provided so that the input rotation speed Nin can be detected directly.

It should be noted that when the map having the characteristics shown in FIG. 6 is used, the input rotation speed Nin set on an abscissa of the diagram in FIG. 6 may be replaced by the engine rotation speed Ne.

Alternatively, instead of referring to a map, a time required to discharge the working fluid from the operation chamber 9 reliably even when the input rotation speed Nin is low may be set in advance as a fixed value not dependent on the input rotation speed Nin, and this fixed value may be stored in the ROM of the engine control module 41 as the predetermined value T1 used in the comparison of the step S3.

When the determination of the step S3 is affirmative, the engine control module 41 performs the processing of a step S4. When the determination of the step S3 is negative, the engine control module 41 terminates the routine immediately.

In the step S4, the engine control module 41 determines whether or not the coolant temperature Tw detected by the coolant temperature sensor 44 is equal to or higher than a predetermined value T2.

When the coolant temperature Tw is low, the working fluid may freeze, and if the determination as to whether or not ON sticking has occurred in the valve main body 18 is performed in this condition, a misdiagnosis is likely to occur. When the working fluid freezes, the fan coupling device 1 does not function correctly, and it is pointless to determine whether or not ON sticking has occurred in a situation where the fan coupling device 1 is not functioning correctly. The predetermined value T2 is set at 0° C., for example.

When the determination of the step S4 is affirmative, the engine control module 41 performs the processing of a step S5. When the determination of the step S4 is negative, the engine control module 41 terminates the routine immediately.

In the step S5, a determination is made as to whether or not the outside air temperature Ta detected by the outside air temperature sensor 45 is equal to or higher than a predetermined value T3. When the outside air temperature Ta is low, the working fluid may freeze, and when ON sticking of the valve main body 18 is diagnosed in this situation, a misdiagnosis is likely to occur. When the working fluid freezes, the fan coupling device 1 does not function correctly, and it is pointless to determine whether or not ON sticking has occurred in a situation where the fan coupling device 1 is not functioning correctly. The predetermined value T3 is set to be identical to the predetermined value T2, i.e. at 0° C., for example.

When the determination of the step S5 is affirmative, the engine control module 41 performs the processing of a step S6. When the determination of the step S5 is negative, the engine control module 41 terminates the routine immediately.

In the step S6, the engine control module 41 determines whether or not a predetermined time has elapsed following startup of the internal combustion engine 31. The elapsed time following startup of the internal combustion engine 31 is measured by the engine control module 41 that activates the internal combustion engine 31. In other words, the engine control module 41 functions as a sensor that detects the elapsed time following startup of the internal combustion engine 31. The determination of the step S6 is performed for the following reason.

When the internal combustion engine 31 is inoperative, working fluid may gather in the operation chamber 9 and the fluid coupling 12. When, in this case, the command duty immediately after startup of the internal combustion engine 31 is 0%, the engine control module 41 executes the processing of the step S2 onward. Immediately after startup, the internal combustion engine 31 is in an idle operating condition and the input rotation speed Nin is low, and therefore a considerable amount of time is required to recirculate the working fluid gathered in the operation chamber 9 and the fluid coupling 12 to the storage chamber 8. Working oil remains in the operation chamber 9 and the fluid coupling 12 until recirculation is complete, and throughout this period the fan rotation speed Nfan barely decreases.

However, when the input rotation speed Nin is comparatively high and the temperature is in a region where the working fluid does not freeze, the conditions of the steps S3 to S5 are cleared in a short time following startup of the internal combustion engine 31. As a result, sticking may be determined through comparison with the aforesaid threshold before the fan rotation speed Nfan has decreased sufficiently.

Figure 7:
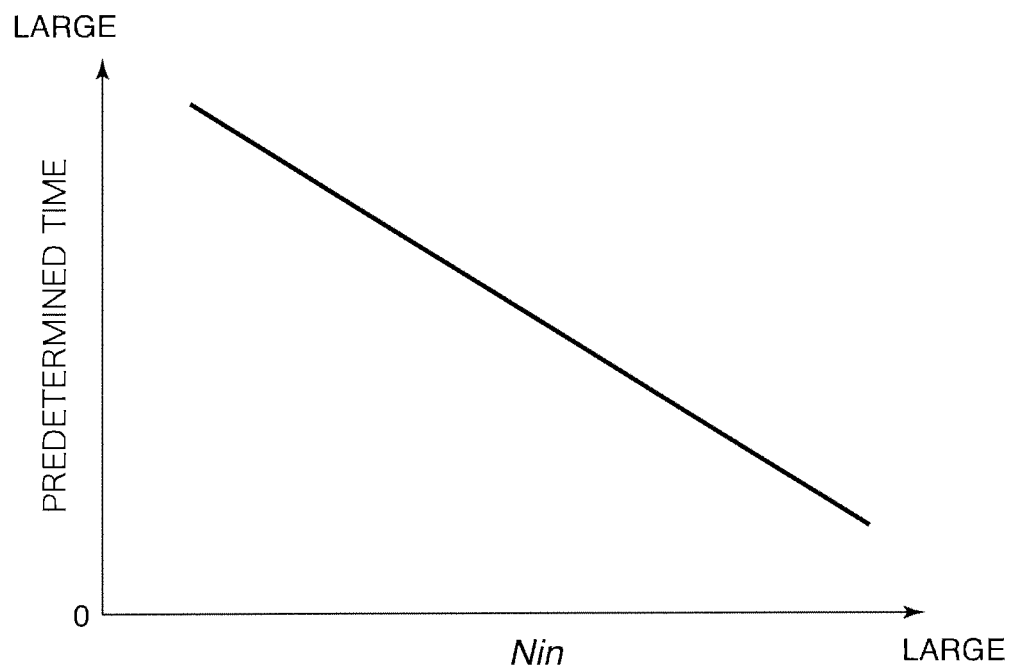
FIG. 7 is a diagram showing characteristics of a map of a predetermined time, which is stored by the engine control module.

The step S6 is therefore set in consideration of a case where the internal combustion engine 31 is started while working fluid remains in the operation chamber 9 and the fluid coupling 12. More specifically, the sticking determination is not performed until recirculation of the working fluid gathered in the operation chamber 9 and the fluid coupling 12 to the storage chamber 8 is complete following startup of the internal combustion engine 31. The predetermined time therefore corresponds to a time required for the completion of this operation. A map of the predetermined time having the characteristics shown in FIG. 7 is stored in the engine control module 41 in advance, and the engine control module 41 calculates the predetermined time from the input rotation speed Nin by searching the map. As shown in FIG. 7, the predetermined time is set on the map to increase as the input rotation speed Nin decreases.

By executing the steps S1 to S6, it is possible to determine whether or not all of the following conditions are satisfied.
(1) The command duty is at 0% (step S1)
(2) The duty OFF timer is at or above the predetermined value T1 (step S3)
(3) The coolant temperature Tw is at or above the predetermined value T2 (step S4)
(4) The outside air temperature Ta is at or above the predetermined value T3 (step S5)
(5) The predetermined time has elapsed following engine startup (step S6)

The engine control module 41 determines that the diagnosis permission conditions are established only when all of the conditions (1) to (5) are satisfied, whereupon the processing of a step S7 onward is performed. When any of the conditions (1) to (5) is not satisfied, diagnosis is not permitted and the routine is terminated.

When all of the diagnosis permission conditions (1) to (5) are established, a diagnosis is performed in steps S7 to S12 to determine whether or not ON sticking has occurred in the valve main body 18.

First, in the step S7, the actual fan rotation speed Nfan detected by the fan rotation speed sensor 42 is compared with a threshold. A map having the characteristics shown in FIG. 3 is stored in the ROM of the engine control module 41 in advance. Before executing the routine, the engine control module 41 determines the threshold from the input rotation speed Nin by searching the map. The threshold used in the step S7 takes a value determined in this manner. When, in the step S7, the actual fan rotation speed Nfan is lower than the threshold, the engine control module 41 advances to a step S11 in order to reset a diagnosis timer, and then terminates the routine.

When the actual fan rotation speed Nfan is equal to or higher than the threshold in the step S7, ON sticking may have occurred in the valve main body 18. In this case, the engine control module 41 increments the diagnosis timer by adding one to a diagnosis timer value in a step S8. Assuming that the routine execution interval is ten milliseconds, an increment unit of the diagnosis timer value is converted into a time so as to correspond to ten milliseconds.

By executing the steps S7, S8, and S11, a duration of a condition in which the actual fan rotation speed Nfan equals or exceeds the threshold is measured.

In a step S9, the engine control module 41 determines whether or not the diagnosis timer value is equal to or greater than a predetermined value T4. The predetermined value T4 is a fixed value set at several seconds.

When the determination of the step S9 is affirmative, the engine control module 41 determines that ON sticking has occurred in the valve main body 18 in a step S10. In response to this determination, measures such as switching an ON sticking flag ON or displaying an ON sticking warning on a display device are taken. When the determination of the step S9 is negative, the engine control module 41 terminates the routine.

By executing the routine described above, sticking of the solenoid valve can be diagnosed accurately without being affected by variation in the rotation speed of the input shaft 3.

The steps S8 and S9 are provided to ensure that ON sticking is determined to have occurred in the valve main body 18 only when the condition in which the actual fan rotation speed Nfan equals or exceeds the threshold continues for the predetermined time. In so doing, an erroneous determination of ON sticking in the valve main body 18 can be prevented in a case where the actual fan rotation speed Nfan equals or exceeds the threshold briefly for some reason.

Referring back to FIG. 4, a timing at which the determination of the step S6 on the flowchart of FIG. 5 first becomes affirmative corresponds to the time t2 in FIG. 4. The time t2 is determined by the predetermined value T1 used in the step S3 of FIG. 5. When ON sticking has not occurred in the valve main body 18 at the diagnosis timing of the time t2, the actual fan rotation speed Nfan, indicated by a solid line in FIG. 4, is lower than the threshold. Hence, on the flowchart of FIG. 5, the routine advances from the step S7 to the step S11, where the diagnosis timer is reset.

According to this diagnosis device, the diagnosis timer value is not increased when ON sticking has not occurred in the valve main body 18, and ON sticking is not determined to have occurred in the valve main body 18 until the diagnosis timer value reaches the predetermined value T4. For example, ON sticking is not determined to have occurred in the valve main body 18 when the actual fan rotation speed Nfan is lower than the threshold at the time t2, and in this case, the diagnosis timer is simply reset in the step S11.

Further, when the diagnosis is started in a condition where the input rotation speed Nin is low, the threshold set by referring to the map shown in FIG. 3 takes a small value. When the input rotation speed Nin is low, the actual fan rotation speed Nfan is also low, but since the threshold is set at a small value, there is no danger of determining erroneously that ON sticking has not occurred in the valve main body 18 as a result of the comparison between the actual fan rotation speed Nfan and the threshold.

ON sticking is not determined to have occurred in the valve main body 18 as soon as the actual fan rotation speed Nfan exceeds the threshold at the time t2, and instead, the engine control module 41 increments the diagnosis timer value in the step S8. The engine control module 41 only determines that ON sticking has occurred in the valve main body 18 in the step S10 when the actual fan rotation speed Nfan remains at or above the threshold until the timing of a time t3, which is later than the time t2 by the predetermined value T4.

In this diagnosis device, the time required for all of the working fluid in the operation chamber 9 to be discharged from the timing at which the command duty is switched to 0% is set as the predetermined value T1, and the diagnosis is not permitted until the duty OFF timer value reaches or exceeds the predetermined value T1. Hence, there is no danger of a misdiagnosis even when discharge of the working fluid from the operation chamber 9 is delayed. Furthermore, the predetermined value T1 is set in accordance with the input rotation speed Nin, and therefore the diagnosis is not affected by differences in the input rotation speed Nin.

The diagnosis is not performed when the coolant temperature Tw and the outside air temperature Ta are at or below their respective freezing temperatures, and therefore effects on the diagnosis from freezing of the working fluid can also be eliminated.

The threshold is set at a larger value as the input rotation speed Nin increases, and therefore effects on the diagnosis from the input rotation speed Nin can also be eliminated.

According to this diagnosis device, therefore, ON sticking of the valve main body 18 can be determined with a high degree of precision.

Figure 8:
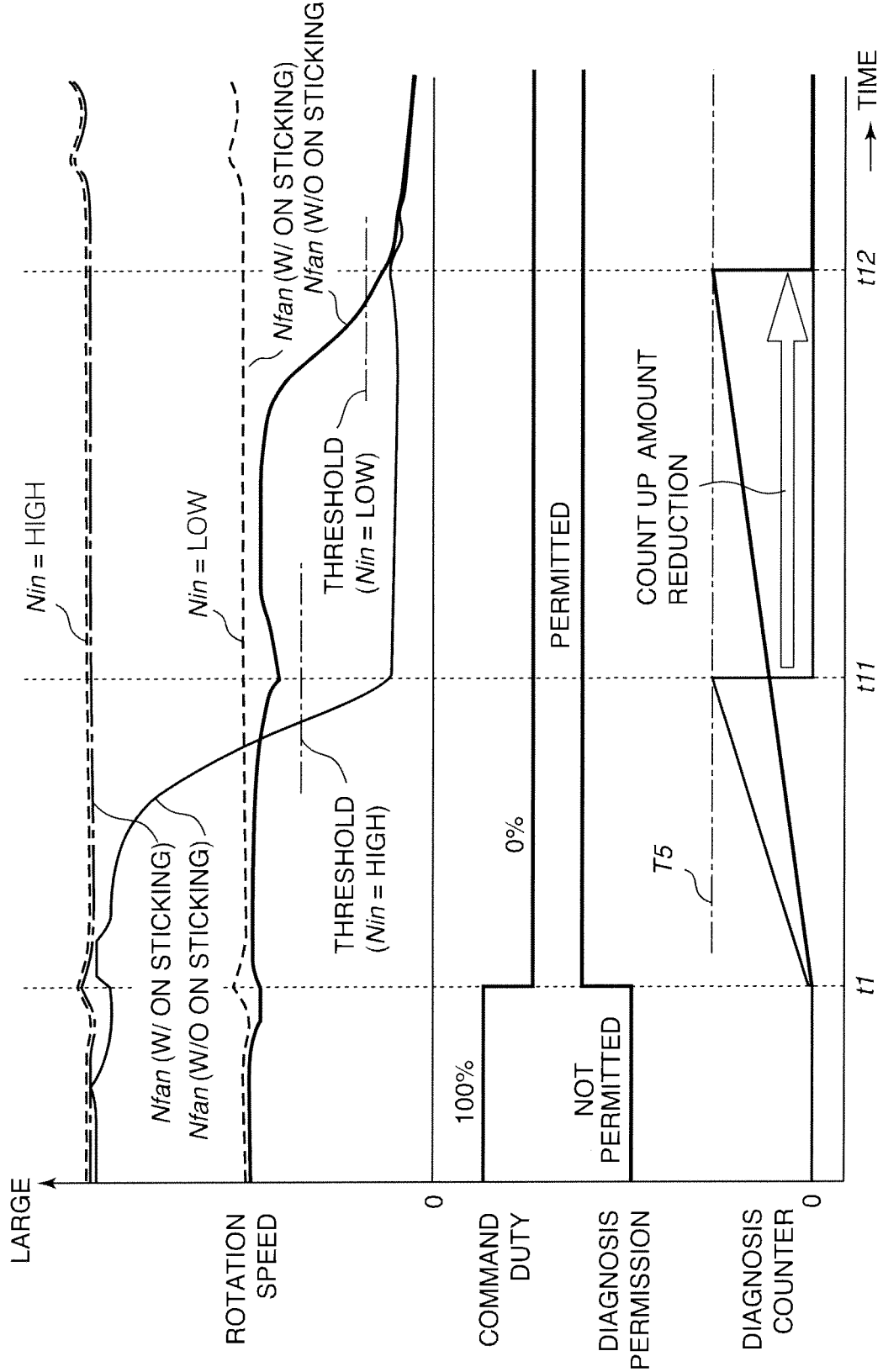
FIG. 8 is a timing chart illustrating a malfunction diagnosis algorithm according to a second embodiment of this invention.
Figure 9:
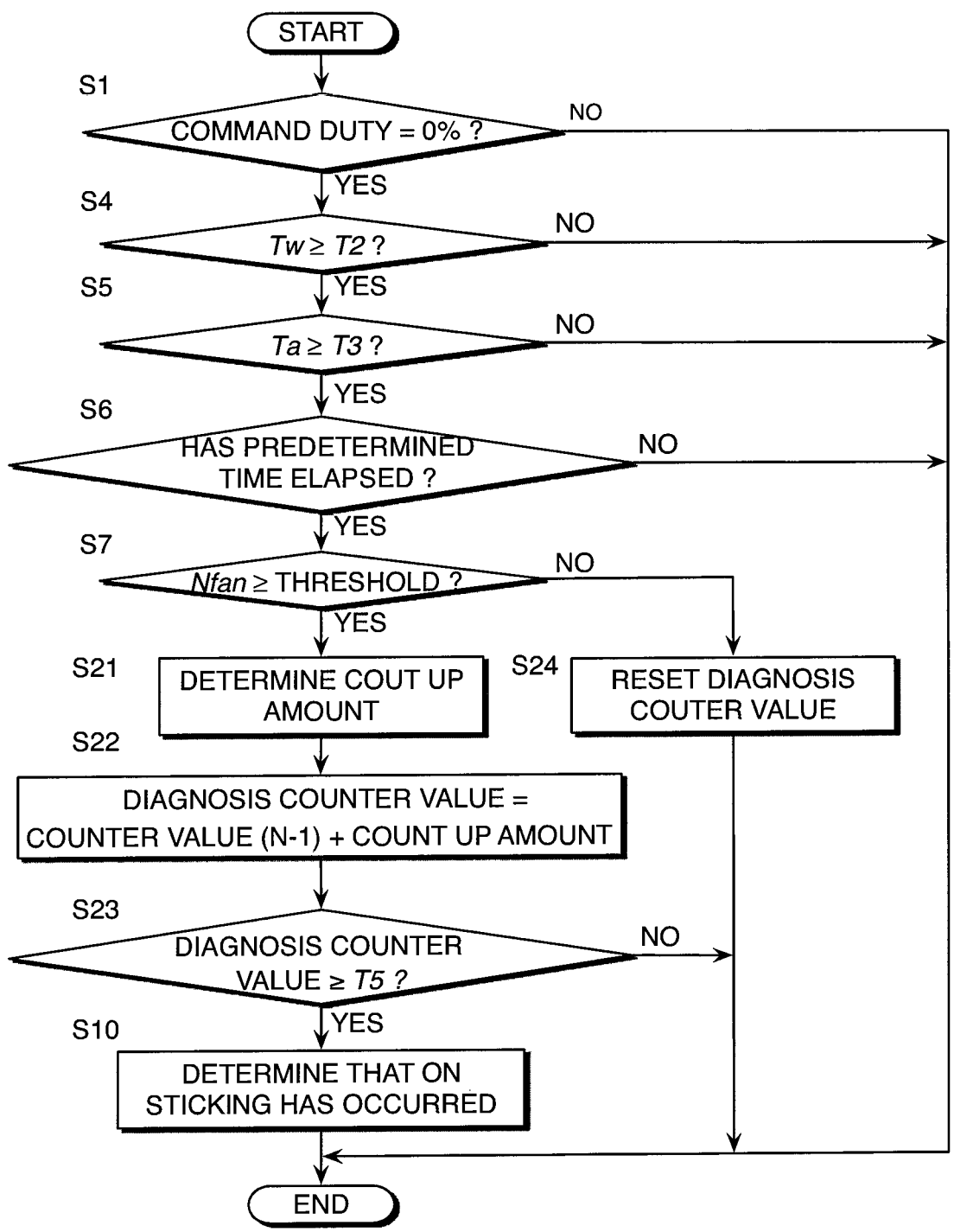
FIG. 9 is a flowchart illustrating a sticking diagnosis routine executed in relation to the solenoid valve by an engine control module according to the second embodiment of this invention.

Referring to FIGS. 8 and 9, a second embodiment of this invention will be described.

FIG. 8 shows a transition of the actual fan rotation speed Nfan in a case where the command duty is switched to 0% when ON sticking has not occurred in the valve main body 18 and a case where the command duty is switched to 0% when ON sticking has occurred in the valve main body 18 while the input rotation speed Nin is either high or low. More specifically, FIG. 8 shows the following cases (1) to (4)

(1) ON sticking has not occurred and the input rotation speed Nin is high, indicated by a thin solid line in the figure
(2) ON sticking has not occurred and the input rotation speed Nin is low, indicated by a thick solid line in the figure
(3) ON sticking has occurred and the input rotation speed Nin is high, indicated by a thin dot-dash line in the figure
(4) ON sticking has occurred and the input rotation speed Nin is low, indicated by a thick dot-dash line in the figure In case (1), a reduction speed of the actual fan rotation speed Nfan is relatively high, and therefore the actual fan rotation speed Nfan decreases early. In case (3), the actual fan rotation speed Nfan does not decrease. In case (2), the reduction speed of the actual fan rotation speed Nfan is relatively gentle, and therefore the actual fan rotation speed Nfan decreases at a delay relative to case (1). In case (4), the actual fan rotation speed Nfan does not decrease.

Hence, when the actual fan rotation speed Nfan at the point where the command duty is switched to 0% differs, a difference occurs in an appropriate diagnosis timing.

For example, by setting a high input rotation speed threshold and a low rotation speed threshold as shown in the figure and using a time t11 as a diagnosis start timing in cases (1) and (3), it is possible to determine whether or not ON sticking has occurred correctly. When the same time t11 is used as the diagnosis start timing in cases (2) and (4), on the other hand, the actual fan rotation speed Nfan is equal to or higher than the low rotation speed threshold in case (4), leading to a misdiagnosis of ON sticking in the valve main body 18. It is therefore necessary to delay the diagnosis start timing used in cases (2) and (4) relative to cases (1) and (3).

In this embodiment, a time t12 at which the actual fan rotation speed Nfan decreases below the low rotation speed threshold is set as the diagnosis start timing of cases (2) and (4).

Referring to FIG. 9, a routine for diagnosing sticking of the solenoid valve, which is executed by the engine control module 41 for this purpose, will be described. The engine control module 41 executes this routine in place of the routine shown in FIG. 5. The routine execution conditions are identical to those of the routine shown in FIG. 5. For ease of description, steps involving identical processing to the routine of FIG. 5 have been allocated identical step numbers.

Main differences between this routine and the routine of FIG. 5 are as follows.
(1) The duty OFF timer is discarded, and therefore the steps S2, S3, and S13 are omitted.
(2) A diagnosis counter is introduced in place of the diagnosis timer, and steps S21 to S24 are provided in place of the steps S8, S9, and S10.

When, in this routine, the determinations of the steps S1, S4, S5, and S6 are all affirmative, the engine control module 41 determines that the diagnosis permission conditions are established.

Having determined that the diagnosis permission conditions are established, the engine control module 41 determines in the step S7 whether or not the actual fan rotation speed Nfan detected by the fan rotation speed sensor 42 is equal to or higher than the threshold. The threshold used here takes an identical value to that of the first embodiment.

When the determination is negative, the engine control module 41 advances to a step S24 and resets the diagnosis counter before terminating the routine.

Likewise in this embodiment, it is not determined that ON sticking has not occurred in the valve main body 18 even when the actual fan rotation speed Nfan is lower than the threshold, and instead, the diagnosis counter is simply reset.

Further, when the diagnosis is started in a condition where the input rotation speed Nin is low, the threshold set by referring to the map shown in FIG. 3 takes a small value. When the input rotation speed Nin is low, the actual fan rotation speed Nfan is also low, but since the threshold is set at a small value, there is no danger of determining erroneously that ON sticking has not occurred in the valve main body 18 as a result of the comparison between the actual fan rotation speed Nfan and the threshold.

Figure 10:
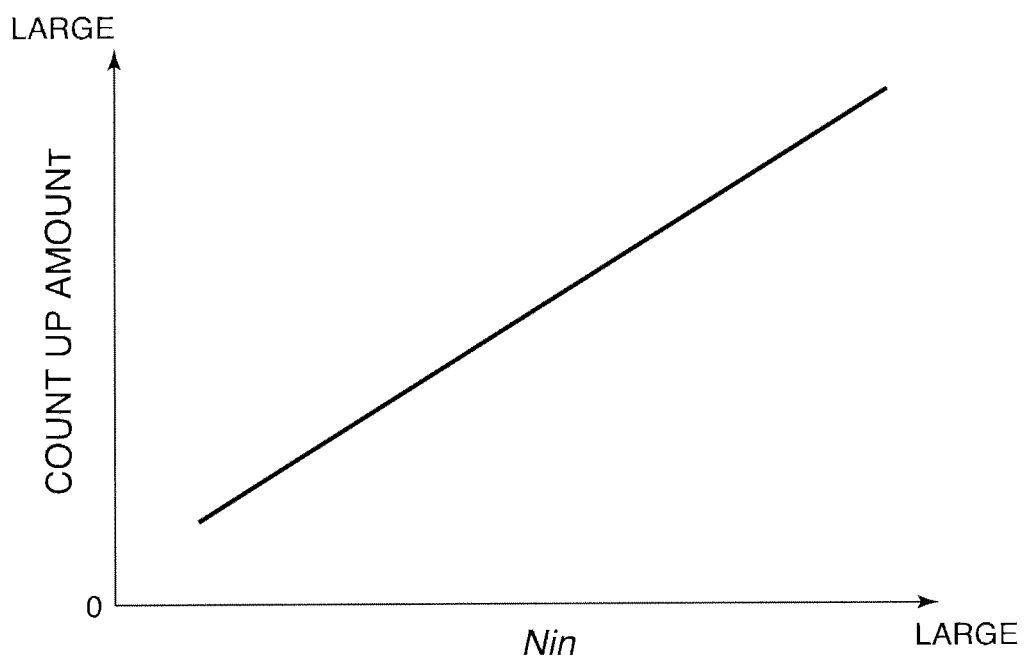
FIG. 10 is a diagram showing characteristics of a map of a count up amount, which is stored by the engine control module according to the second embodiment of this invention.

When the determination of the step S7 is affirmative, on the other hand, the engine control module 41 determines a count up amount from the input rotation speed Nin in the step S21 by searching a map having the characteristics shown in FIG. 10, which is stored in the ROM in advance.

Next, in a step S22, the engine control module 41 adds the count up amount to the diagnosis counter value using a following Equation (2).

$$\text{Diagnosis counter value} = \text{diagnosis counter value}(n-1) + \text{count up amount} \quad (2)$$

where, diagnosis counter value($n-1$)=previous value of diagnosis counter value.

The diagnosis counter is reset to zero as the internal combustion engine 1 is started.

Referring to FIG. 10, the count up amount is set to be smaller as the input rotation speed Nin decreases. Even in a case where ON sticking has not occurred in the valve main body 18, when the actual fan rotation speed Nfan at the time t1 where the command duty is switched to 0% is relatively low, the working fluid is not easily discharged from the operation chamber 9, and therefore the actual fan rotation speed Nfan does not decrease easily. According to this map, the count up amount is reduced as the input rotation speed Nin decreases, and therefore as the actual fan rotation speed Nfan decreases. Hence, when the input rotation speed Nin is low, a situation in which the same count up amount is applied such that ON sticking in the valve main body 18 is misdiagnosed can be prevented.

In a step S23, a determination is made as to whether or not the diagnosis counter value is equal to or greater than a predetermined value T5. The predetermined value T5 is a value for determining the diagnosis timing, and is set in advance through experiments and simulations. When the diagnosis counter value is smaller than the predetermined value T5, the engine control module 41 determines that the diagnosis timing has not arrived, and therefore terminates the routine.

When the diagnosis counter value is determined to be equal to or greater than the predetermined value T5 in the step S23, the engine control module 41 determines that ON sticking has occurred in the valve main body 18. In response to this determination, measures such as switching the ON sticking flag ON or displaying an ON sticking warning on the display device are taken.

In this embodiment, the determination as to whether or not ON sticking has occurred in the valve main body 18 is made after the diagnosis counter value, which is counted up from the time t1 at which the command duty is switched to 0%, reaches the predetermined value T5. Further, the count up amount is set on the basis of the input rotation speed Nin.

Referring back to FIG. 8, by executing the routine shown in FIG. 9, the count up amount of the diagnosis counter used in case (4) is set to be smaller than the count up amount of the diagnosis counter used in case (3). The diagnosis counter value of case (3) reaches the predetermined value T5 at the time t11, whereas the diagnosis counter value of case (4) reaches the predetermined value T5 at the time t12, i.e. later than the diagnosis counter value of case (3).

According to this embodiment, the timing of the determination as to whether or not ON sticking has occurred in the valve main body 18 is varied in accordance with the input rotation speed Nin at the point where the command duty is switched to 0%. It is therefore possible in this embodiment also to diagnose sticking of the solenoid valve accurately without being affected by variation in the rotation speed of the input shaft 3.

The contents of Tokugan 2009-286099, with a filing date of Dec. 17, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the determinations of the steps S4 to S6 of the flowcharts shown in FIGS. 5 and 9 are made to determine whether or not the operating conditions of the internal combustion engine 31 are suitable for determining ON sticking of the valve main body 18. However, the determinations of the steps S4 to S6, which are made using the coolant temperature Tw, the outside air temperature Ta, and the elapsed time following engine startup, are merely examples of determinations as to whether or not the operating conditions of the internal combustion engine 31 are suitable for determining ON sticking of the valve main body 18.

For example, the determination as to whether or not the operating conditions of the internal combustion engine 31 are suitable for determining ON sticking of the valve main body 18 may be made using only one of these parameters. Alternatively, a similar determination may be made using other parameters instead of the above parameters.

As described above, this invention is suitable for diagnosing a malfunction in a fan coupling device for a vehicle.

The embodiments of this invention in which an exclusive property or privilege is claimed are defined as follows:

1. A diagnosis device for use with a fan coupling device which connects an internal combustion engine to a cooling fan that blows cooling air onto a radiator for cooling a coolant of the internal combustion engine, the fan coupling device comprising:
    an input shaft that is driven to rotate by the internal combustion engine;
    a fluid coupling that transmits torque from the input shaft to the cooling fan via a fluid; and
    a solenoid valve that adjusts a fluid amount in the fluid coupling, the solenoid valve comprising a valve main body that is displaced in response to energization between a lifted position in which the fluid amount increases and a closed position in which the fluid amount decreases,
    wherein the diagnosis device is used to determine whether or not the valve main body is stuck in the lifted position, the diagnosis device comprising:
    a sensor that detects a rotation speed of the cooling fan; and
    a controller programmed to:
        output a signal in order to return the valve main body to the closed position; and
        start to determine whether or not the valve main body is stuck in the lifted position on the basis of the rotation speed of the cooling fan following the elapse of a predetermined time from output of the signal.

2. The diagnosis device for a fan coupling device as defined in claim 1, wherein the predetermined time is a time required for the fluid to be discharged from the fluid coupling following output of the signal.

3. The diagnosis device for a fan coupling device as defined in claim 1, wherein the controller is further programmed to determine that the valve main body is stuck in the lifted position when the rotation speed of the cooling fan exceeds a threshold for a predetermined period following the start of the sticking determination.

4. The diagnosis device for a fan coupling device as defined in claim 3, further comprising a sensor that detects a rotation speed of the input shaft, wherein the controller is further programmed to set the threshold to be larger as the rotation speed of the input shaft increases.

5. The diagnosis device for a fan coupling device as defined in claim 4, wherein the controller is further programmed to set the predetermined period to be longer as the rotation speed of the input shaft decreases.

6. The diagnosis device for a fan coupling device as defined in claim 1, further comprising a sensor that detects an operating condition of the internal combustion engine, wherein the controller is further programmed to:
    determine whether or not the operating condition of the internal combustion engine satisfies a predetermined condition; and
    not start to determine whether or not the valve main body is stuck in the lifted position when the operating condition of the internal combustion engine does not satisfy the predetermined condition.

7. The diagnosis device for a fan coupling device as defined in claim 6, wherein the sensor that detects the operating condition of the internal combustion engine includes a sensor that detects an elapsed time following startup of the internal combustion engine, and the controller is further programmed to determine that the operating condition of the internal combustion engine does not satisfy the predetermined condition when the elapsed time following startup of the internal combustion engine has not reached a predetermined time.

8. The diagnosis device for a fan coupling device as defined in claim 6, wherein the sensor that detects the operating condition of the internal combustion engine includes a sensor that detects an outside air temperature, and the controller is further programmed to determine that the operating condition of the internal combustion engine does not satisfy the predetermined condition when the outside air temperature is lower than a predetermined temperature.

9. The diagnosis device for a fan coupling device as defined in claim 6, wherein the sensor that detects the operating condition of the internal combustion engine includes a sensor that detects a coolant temperature, and the controller is further programmed to determine that the operating condition of the internal combustion engine does not satisfy the predetermined condition when the coolant temperature is lower than a predetermined temperature.

10. A diagnosis device for use with a fan coupling device which connects an internal combustion engine to a cooling fan that blows cooling air onto a radiator for cooling a coolant of the internal combustion engine, the fan coupling device comprising:

an input shaft that is driven to rotate by the internal combustion engine;

a fluid coupling that transmits torque from the input shaft to the cooling fan via a fluid; and a solenoid valve that adjusts a fluid amount in the fluid coupling via a valve main body that is displaced in response to energization between a lifted position in which the fluid amount increases and a closed position in which the fluid amount decreases, wherein the diagnosis device is used to determine whether or not the valve main body is stuck in the lifted position, the diagnosis device comprising:

means for detecting a rotation speed of the cooling fan;

means for outputting a signal in order to return the valve main body to the closed position; and means for starting to determine whether or not the valve main body is stuck in the lifted position on the basis of the rotation speed of the cooling fan following the elapse of a predetermined time from output of the signal.

11. A diagnosis method for use with a fan coupling device which connects an internal combustion engine to a cooling fan that blows cooling air onto a radiator for cooling a coolant of the internal combustion engine, the fan coupling device comprising:

an input shaft that is driven to rotate by the internal combustion engine;

a fluid coupling that transmits torque from the input shaft to the cooling fan via a fluid; and a solenoid valve that adjusts a fluid amount in the fluid coupling via a valve main body that is displaced in response to energization between a lifted position in which the fluid amount increases and a closed position in which the fluid amount decreases, wherein the diagnosis method is used to determine whether or not the valve main body is stuck in the lifted position, the diagnosis method comprising:

detecting a rotation speed of the cooling fan;

outputting a signal in order to return the valve main body to the closed position; and starting to determine whether or not the valve main body is stuck in the lifted position on the basis of the rotation speed of the cooling fan following the elapse of a predetermined time from output of the signal.

* * * * *